(12) United States Patent
Bent et al.

(10) Patent No.: US 8,145,652 B2
(45) Date of Patent: Mar. 27, 2012

(54) AUTOMATED PROPAGATION OF NON-CONFLICTING QUERIES IN DISTRIBUTED DATABASES

(75) Inventors: Graham A. Bent, Southampton (GB); Patrick Dantressangle, Ford (GB); David R. Vyvyan, Southampton (GB)

(73) Assignee: International Business Machines Corporation, Armonk, NY (US)

(*) Notice: Subject to any disclaimer, the term of this patent is extended or adjusted under 35 U.S.C. 154(b) by 356 days.

(21) Appl. No.: 12/248,082

(22) Filed: Oct. 9, 2008

(65) Prior Publication Data
US 2010/0094892 A1    Apr. 15, 2010

(51) Int. Cl.
*G06F 7/00* (2006.01)
*G06F 17/30* (2006.01)

(52) U.S. Cl. ........ 707/755; 707/756; 707/758; 707/760; 707/770; 707/781; 709/203

(58) Field of Classification Search ............... 707/755, 707/756, 758, 760, 770, 781; 709/203
See application file for complete search history.

(56) References Cited

U.S. PATENT DOCUMENTS

| | | | |
|---|---|---|---|
| 5,295,256 A | 3/1994 | Bapat | |
| 5,408,652 A | 4/1995 | Hayashi et al. | |
| 5,794,229 A * | 8/1998 | French et al. | 707/999.002 |
| 5,873,088 A | 2/1999 | Hayashi et al. | |
| 5,937,402 A * | 8/1999 | Pandit | 1/1 |
| 6,175,837 B1 | 1/2001 | Sharma et al. | |
| 6,226,788 B1 * | 5/2001 | Schoening et al. | 709/203 |
| 6,708,186 B1 * | 3/2004 | Claborn et al. | 707/754 |
| 6,950,823 B2 * | 9/2005 | Amiri et al. | 707/690 |
| 7,251,653 B2 * | 7/2007 | Huang et al. | 707/756 |
| 7,403,956 B2 * | 7/2008 | Vaschillo et al. | 707/770 |
| 7,752,213 B2 * | 7/2010 | Todd | 707/755 |
| 7,921,131 B2 * | 4/2011 | Uppala | 707/770 |
| 7,974,961 B2 * | 7/2011 | Barbarek | 707/705 |
| 8,051,213 B2 * | 11/2011 | Van Hensbergen et al. | 709/250 |
| 2004/0044727 A1 | 3/2004 | Abdelaziz et al. | |
| 2005/0065925 A1 | 3/2005 | Weissman et al. | |
| 2005/0096124 A1 | 5/2005 | Stronach | |
| 2005/0136073 A1 | 6/2005 | Zhou et al. | |
| 2005/0223022 A1 * | 10/2005 | Weissman et al. | 707/102 |
| 2005/0246338 A1 * | 11/2005 | Bird | 707/9 |
| 2006/0053112 A1 | 3/2006 | Chitkara et al. | |
| 2006/0225072 A1 | 10/2006 | Lari et al. | |

(Continued)

OTHER PUBLICATIONS

Roy Morien—"Agile Development of the Databases: A Focal Entity Prototyping Approach"—Proceedings of Agile Development Conference (ADC'05)—Jul. 24-29, 2005 IEEE (pp. 103-110:1-8).*

(Continued)

*Primary Examiner* — Robert Stevens
*Assistant Examiner* — Anh Ly
(74) *Attorney, Agent, or Firm* — Lee Law, PLLC; Christopher B. Lee (57) ABSTRACT

A logical table definition is received in association with a database query within a distributed database system. A determination is made as to whether the received logical table definition matches a local logical table definition. The query is processed in response to determining that the received logical table definition matches the local logical table definition. The query is forwarded to at least one other distributed database node. This abstract is not to be considered limiting, since other embodiments may deviate from the features described in this abstract.

20 Claims, 6 Drawing Sheets

U.S. PATENT DOCUMENTS

| | | | |
|---|---|---|---|
| 2007/0002869 | A1 | 1/2007 | Miller |
| 2009/0063453 | A1 | 3/2009 | Adler et al. |
| 2009/0063524 | A1 | 3/2009 | Adler et al. |
| 2009/0193006 | A1* | 7/2009 | Herrnstadt .................. 707/5 |
| 2010/0094902 | A1* | 4/2010 | Vyvyan .................. 707/781 |

OTHER PUBLICATIONS

Joseph Sack—"SQL Server 2008 Transact-SQL Recipes—Chapter 4 Tables"—2008 SpringerLink (pp. 143-195:1-53).*

United States Patent and Trademark Office, Office Action for U.S. Appl. No. 12/248,304, filed Apr. 1, 2011, pp. 1-19, Alexandria, VA, USA.

United States Patent and Trademark Office, Office Action for U.S. Appl. No. 12/248,241, filed May 13, 2011, pp. 1-28, Alexandria, VA, USA.

United States Patent and Trademark Office, Office Action for U.S. Appl. No. 12/248,140, filed Apr. 13, 2011, pp. 1-15, Alexandria, VA, USA.

United States Patent and Trademark Office, Office Action for U.S. Appl. No. 12/248,170, filed Mar. 17, 2011, pp. 1-12, Alexandria, VA, USA.

United States Patent and Trademark Office, Office Action for U.S. Appl. No. 12/248,109, filed Mar. 1, 2011, pp. 1-13, Alexandria, VA, USA.

Examiner, United States Patent and Trademark Office, Office Action for U.S. Appl. No.: 12/248,304, filed Sep. 19, 2011, pp. 1-25, Alexandria, VA, USA.

Examiner, United States Patent and Trademark Office, Office Action for U.S. Appl. No.: 12/248,241, filed Nov. 9, 2011, pp. 1-33, Alexandria, VA, USA.

Examiner, United States Patent and Trademark Office, Office Action for U.S. Appl. No.: 12/248,140, filed Oct. 13, 2011, pp. 1-18, Alexandria, VA, USA.

Examiner, United States Patent and Trademark Office, Office Action for U.S. Appl. No.: 12/248,170, filed Sep. 30, 2011, pp. 1-18, Alexandria, VA, USA.

Examiner, United States Patent and Trademark Office, Office Action for U.S. Appl. No.: 12/248,109, Sep. 1, 2011, pp. 1-20, Alexandria, VA, USA.

Boon-Chong Seet, et al., Route discovery optimization for dynamic source routing in mobile ad hoc networks, Article, Sep. 15, 2000, pp. 1-7, School of Computer Engineering, Nanyang Technological University, Singapore.

Examiner, United States Patent and Trademark Office, Office Action for U.S. Appl. No.: 12/248,109, filed Dec. 7, 2011, pp. 1-20, Alexandria, VA, USA.

* cited by examiner

AUTOMATED PROPAGATION OF NON-CONFLICTING QUERIES IN DISTRIBUTED DATABASES

This invention was made with Government support under W911NF-06-3-0001 awarded by United States Army. The Government has certain rights to this invention.

RELATED APPLICATIONS

This application is related to the application titled "AUTOMATED DATA CONVERSION AND ROUTE TRACKING IN DISTRIBUTED DATABASES," filed contemporaneously herewith on Oct. 9, 2008, and assigned application Ser. No. 12/248,140, to the application titled "AUTOMATED DATA SOURCE ASSURANCE IN DISTRIBUTED DATABASES," filed contemporaneously herewith on Oct. 9, 2008, and assigned application Ser. No. 12/248,109, to the application titled "AUTOMATED QUERY PATH REPORTING IN DISTRIBUTED DATABASES," filed contemporaneously herewith on Oct. 9, 2008, and assigned application Ser. No. 12/248,170, to the application titled "DYNAMIC CONTEXT DEFINITIONS IN DISTRIBUTED DATABASES," filed contemporaneously Oct. 9, 2008, and assigned application Ser. No. 12/248,241, and to the application titled "NODE-LEVEL SUB-QUERIES IN DISTRIBUTED DATABASES," filed contemporaneously herewith on Oct. 9, 2008, and assigned application Ser. No. 12/248,304, each of which is hereby incorporated by reference as if fully set forth herein.

This application is also related to the application titled "AN APPARATUS FOR PROPAGATING A QUERY," filed in the United Kingdom on Sep. 19, 2007, with application serial number 0718251.2, the application titled "AN APPARATUS FOR STORING A LOGICAL STATEMENT," filed in the United Kingdom on Sep. 19, 2007, with application serial number 0718214.0, and the application titled "AN APPARATUS FOR ENABLING CONNECTIONS," filed in the United Kingdom on Sep. 19, 2007, with application serial number 0718248.8 and filed within the United States on Apr. 11, 2008, with application Ser. No. 12/101,220, each of which is hereby incorporated by reference as if fully set forth herein.

BACKGROUND OF THE INVENTION

1. Field of the Invention

The present invention relates to systems and methods for propagating queries in ad-hoc distributed databases and database systems. More particularly, the present invention relates to automated propagation of non-conflicting queries in distributed databases.

2. Related Art

Distributed databases include multiple databases accessible via a network or other interconnection by a querying computing node. The distributed databases may be logically distributed across multiple access or network domains and may be geographically distributed across physical locations. The querying computing node often uses a centralized registry to identify databases and physical data structures within the identified databases. The physical data structures are identified and accessible globally by name. Queries are issued to an identified database using an identified global name of a physical data structure. Query results are returned from the identified database in response to the issued query.

BRIEF SUMMARY OF THE INVENTION

The subject matter described herein provides capabilities for automated propagation of non-conflicting queries in ad-hoc distributed databases. For purposes of the present subject matter, "ad-hoc" encompasses systems that are fit for purposes of the present subject matter with any kind of connection strategy that may be employed. Logical data structures (e.g., tables) are defined and stored at a querying (e.g., originating) node. Distributed database nodes also define local logical tables. The local logical tables allow the distributed database nodes to control which columns in local data storage are federated and exposed at the distributed database level. The logical table definition at the originating node is communicated with a database query to the distributed database nodes. Upon receipt of a query, matching is performed to determine whether the received logical table definition matches a local logical table definition. In response to determining that a matching local logical table definition exists, the query is processed to retrieve data from an associated physical table and a response to the query is sent to the originating node. Nodes that receive the query forward the query to other nodes for processing with either the received logical table definition or the local logical table definition based upon matching criteria and data type precision. Nodes that do not have a matching local table definition respond with a warning.

In response to receipt of a warning, the querying node may choose to modify data types or note the warning for other purposes. In response to receipt of query results, the querying node determines preferred routes based upon time, data quality, and other parameters for future queries. The logical tables allow control over which physical tables are federated and exposed at the distributed database level.

Distributed database nodes may be queried for name definitions for the local logical tables and database catalogs may be created. The database catalogs may be accessed to determine table definitions at the distributed nodes. Matching criteria may be passed with the query to identify requested processing for match determination. Matching may be based upon column name, positional or non-positional data types, or other matching criteria.

A method includes receiving a logical table definition in association with a database query within a distributed database system; determining whether the received logical table definition matches a local logical table definition; processing the query in response to determining that the received logical table definition matches the local logical table definition; and forwarding the query to at least one other distributed database node.

A system includes a memory adapted to store information associated with propagation of non-conflicting queries in distributed databases; and a processor programmed to receive a logical table definition in association with a database query within a distributed database system, determine whether the received logical table definition matches a local logical table definition, process the query in response to determining that the received logical table definition matches the local logical table definition, and forward the query to at least one other distributed database node.

An alternative system includes a memory adapted to store information associated with propagation of non-conflicting queries in distributed databases; and a processor programmed to: receive a logical table definition in association with a database query within a distributed database system; compare at least one of a column name and a column data type of the received logical table definition with at least one of a column name and a column data type of a local logical table definition; determine whether the received logical table definition matches the local logical table definition; in response to determining that the received logical table definition matches the local logical table definition: identify a local physical table associated with the local logical table definition, retrieve at least one data element from a local physical table storage location associated with the local physical table based upon a determination of at least one of a column name match and a column data type match between the received logical table definition and the local logical table definition, and respond to the query with the retrieved at least one data element; and forward the query to at least one other distributed database node.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides capabilities for automated propagation of non-conflicting queries in ad-hoc distributed databases. For purposes of the present subject matter, "ad-hoc" encompasses systems that are fit for purposes of the present subject matter with any kind of connection strategy that may be employed. Logical data structures (e.g., tables) are defined and stored at a querying (e.g., originating) node. Distributed database nodes also define local logical tables. The local logical tables allow the distributed database nodes to control which columns in local data storage are federated and exposed at the distributed database level. The logical table defined at the originating node is communicated with a database query to the distributed database nodes. Upon receipt of a query, matching is performed to determine whether the received logical table matches a local logical table definition. In response to determining that a matching local logical table definition exists, the query is processed to retrieve data from an associated physical table and a response to the query is sent to the originating node. Nodes that receive the query forward the query to other nodes for processing with either the received logical table definition or the local logical table definition based upon matching criteria and data type precision. Nodes that do not have a matching local table definition respond with a warning.

In response to receipt of a warning, the querying node may choose to modify data types or note the warning for other purposes. In response to receipt of query results, the querying node determines preferred routes based upon time, data quality, and other parameters for future queries. The logical tables allow control over which physical tables are federated and exposed at the distributed database level. Distributed database nodes may be queried for name definitions for the local logical tables and database catalogs may be created. The database catalogs may be accessed to determine table definitions at the distributed nodes.

Queries, as described herein, may be based upon Java, extensible stylesheet language transformation (XSLT), extensible markup language (XML), or any other suitable syntax or format. Many possibilities exist for issuing and responding to queries within distributed database system. Accordingly, all are considered within the scope of the present subject matter.

Matching criteria (e.g., matching instructions) may be passed with the query to identify requested processing for match determination. Matching may be based upon column name, positional or non-positional data types, or other matching criteria. Matching instructions may include flags or other indicia passed with the logical table definition to request receiving nodes to perform certain data assurance measures, such as performing column name matching, positional data type matching, non-positional data type matching, and rigorous column name and positional data type matching. For example, based upon the matching instructions, if a local column data type is larger than requested in the received logical table definition, upward promotion of data type for the column may be performed. Similarly, if a local column data type is smaller than requested in the received logical table definition, a mismatch may be declared and a warning may be generated and returned to the querying node. Additionally, receiving nodes may perform rounding or other data type conversion based upon the instructions. Conversion precision changes or other errors may be determined by the originating node based upon analysis of the query results.

The propagation of non-conflicting queries in distributed databases described herein may be performed in real time to allow prompt recognition of preferred routes based upon time and data quality. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art.

Figure 1:
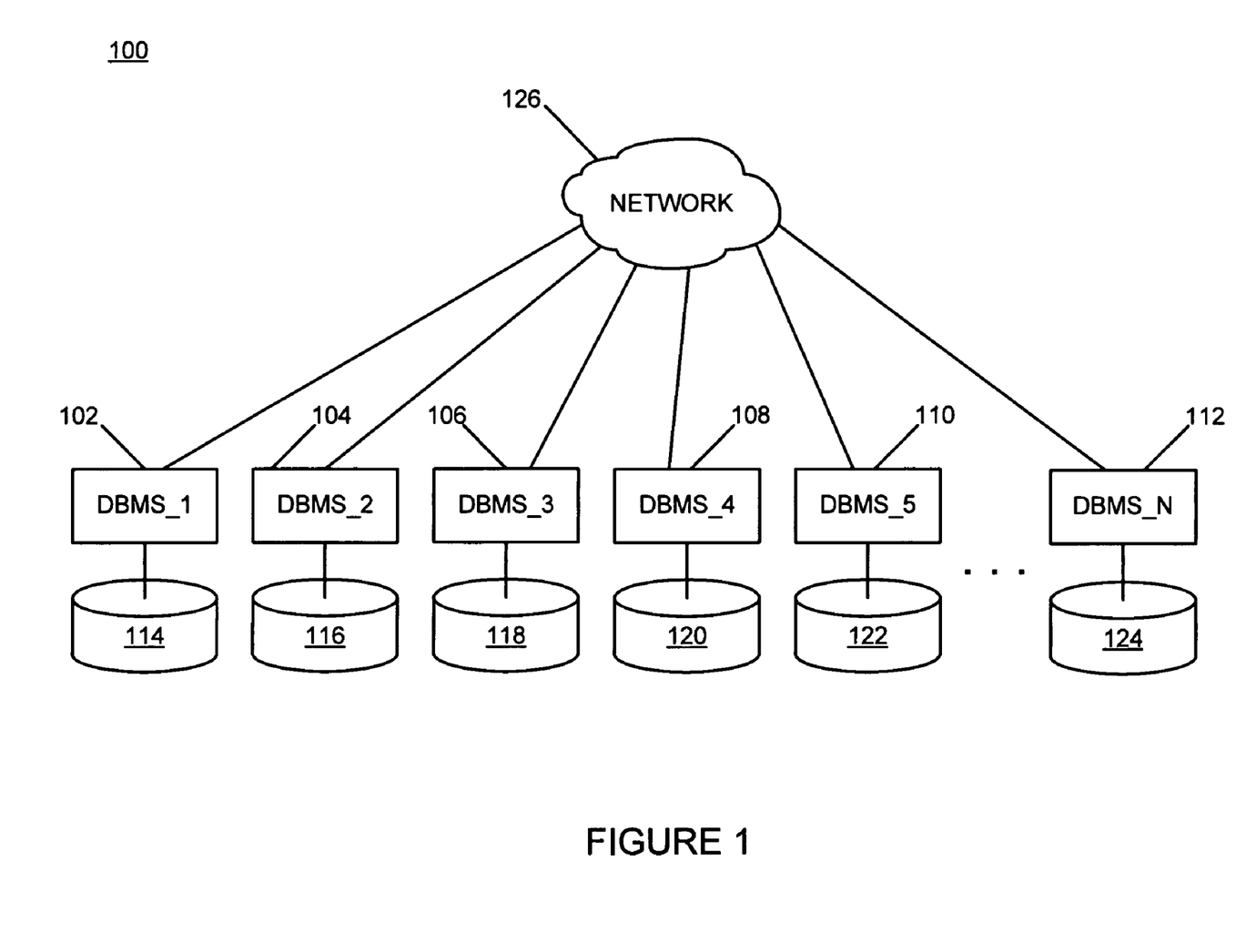
FIG. 1 is a block diagram of an example of an implementation of a system for automated propagation of non-conflicting queries in distributed databases according to an embodiment of the present subject matter.

FIG. 1 is a block diagram of an example of an implementation of a system 100 for automated propagation of non-conflicting queries in distributed databases. Within the system 100, a database management system_1 (DBMS_1) 102, a DBMS_2 104, a DBMS_3 106, a DBMS_4 108, a DBMS_5 110, up to a DBMS_N 112 are illustrated. The DBMS_1 102 through the DBMS_N 112 are each associated with a database 114, a database 116, a database 118, a database 120, a database 122, up to a database 124, respectively. The DBMS_1 102 through the DBMS_N 112 are interconnected via a network 126.

For purposes of the present description, it should be noted that while the network 126 is illustrated as interconnecting the DBMS_1 102 through the DBMS_N 112 with each other, this should not be considered limiting. The network 126 may be formed by any interconnection appropriate for use in a distributed database environment. For example, the network 126 may include any form of interconnection suitable for the intended purpose, including a private or public network such as an intranet or the Internet, respectively, direct inter-module interconnection, dial-up, or any other interconnection mechanism capable of interconnecting the devices with the system 100.

As such, any two or more of the DBMS_1 102 through the DBMS_N 112 may be interconnected by proximity, interconnection, or routing capabilities within the system 100, while certain other of the devices may not have interconnectivity other than via other distributed database devices. Accordingly, certain of the DBMS_1 102 through the DBMS_N 112 may not be capable of communication with one another other than via the other distributed database devices.

As will be described in more detail below in association with FIGS. 2 through 6 below, the DBMS_1 102 through the DBMS_N 112 provide automated propagation of non-conflicting queries within the system 100. The automated propagation of non-conflicting queries in distributed databases is based upon propagation of logical tables in association with database queries.

It should be noted that the DBMS_1 102 through the DBMS_N 112 may be any type of device configurable for storage of information and distributed interconnectivity for database-style queries. For example, the DBMS_1 102 through the DBMS_N 112 may include devices such as a personal computer (e.g., desktop, laptop, palm, etc.) or a handheld device (e.g., cellular telephone, personal digital assistant (PDA), email device, music recording or playback device, etc.), or any other device capable of processing information as described above and in more detail below.

Figure 2:
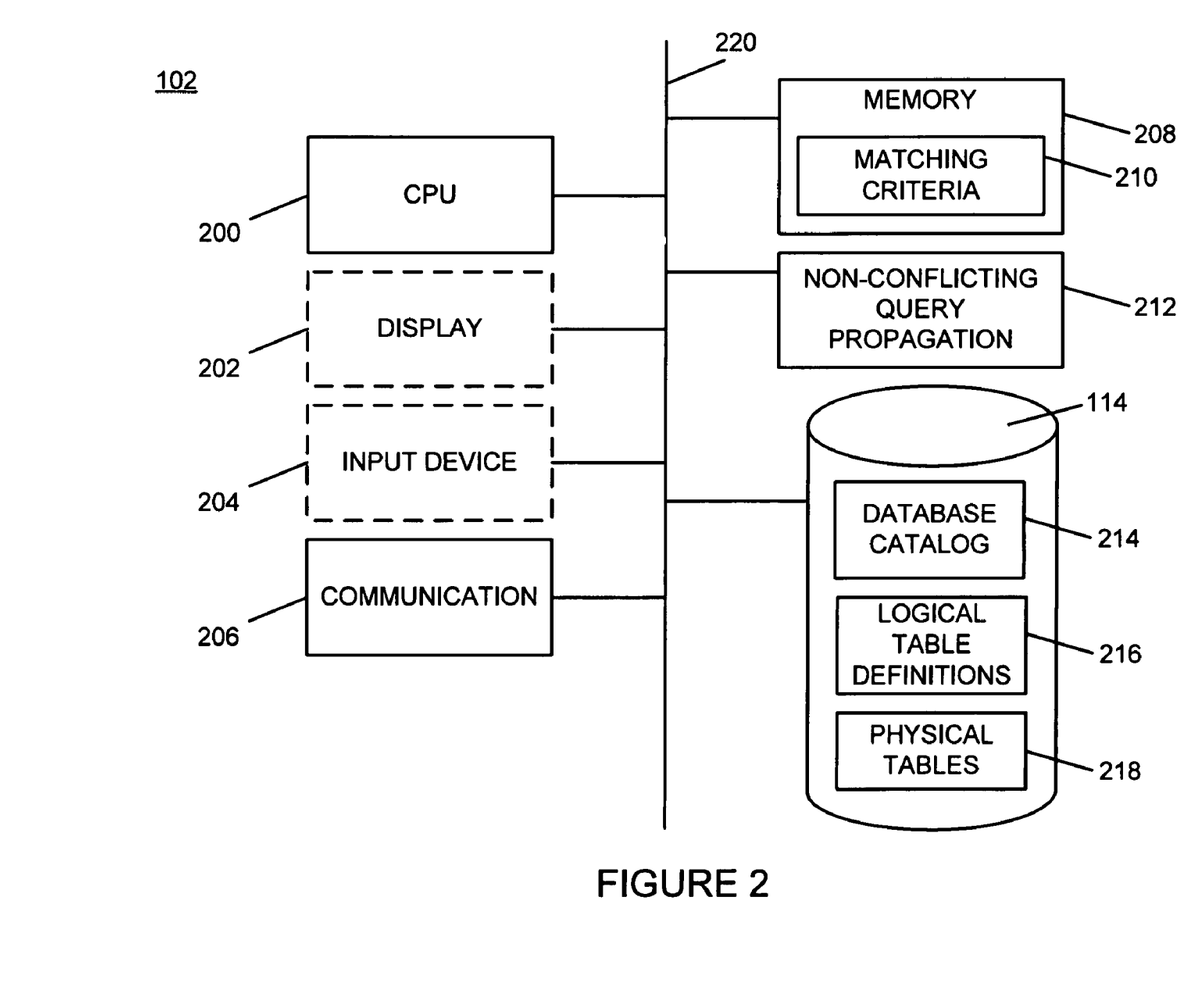
FIG. 2 is a block diagram of an example of an implementation of a database management system that is capable of performing automated propagation of non-conflicting queries based upon propagation of a logical table in association with a database query within a distributed database system according to an embodiment of the present subject matter.

FIG. 2 is a block diagram of an example of an implementation of the DBMS_1 102 that is capable of performing automated propagation of non-conflicting queries based upon propagation of a logical table in association with a database query within a distributed database system, such as the system 100. A central processing unit (CPU) 200 provides computer instruction execution, computation, and other capabilities within the DBMS_1 102. A display 202 provides visual information to a user of the DBMS_1 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they are not required components for the DBMS_1 102. Accordingly, the DBMS_1 102 may operate as a completely automated embedded device without user configurability or feedback. However, the DBMS_1 102 may also provide user feedback and configurability via the display 202 and the input device 204, respectively.

A communication module 206 provides interconnection capabilities that allow the DBMS_1 102 to communicate with other modules within the system 100, such as the DBMS_2 104 through the DBMS_N 112, to perform non-conflicting queries within the system 100. The communication module 206 may include any electrical, protocol, and protocol conversion capabilities useable to provide the interconnection capabilities.

A memory 208 includes a matching criteria storage area 210 that stores information usable to identify processing preferences or priorities for non-conflicting queries within the system 100. As will be described in more detail below, the matching criteria stored within the matching criteria storage area 210 are used to expedite, configure, and control query data selection and processing.

A non-conflicting query propagation module 212 is also illustrated. The non-conflicting query propagation module 212 provides query processing, query forwarding, and query response capabilities for the DBMS_1 102, as described above and in more detail below.

Though the communication module 206 and the non-conflicting query propagation module 212 are illustrated as component-level modules for ease of illustration and description purposes, it should be noted that the communication module 206 and the non-conflicting query propagation module 212 include any hardware, programmed processor(s), and memory used to carry out the respective functions of the communication module 206 and the non-conflicting query propagation module 212 as described above and in more detail below. For example, the communication module 206 and the non-conflicting query propagation module 212 may include additional controller circuitry in the form of application specific integrated circuits (ASICs), processors, antennas, and/or discrete integrated circuits and components for performing communication and electrical control activities associated with the respective modules. Additionally, the communication module 206 and the non-conflicting query propagation module 212 also include interrupt-level, stack-level, and application-level modules as appropriate. Furthermore, the communication module 206 and the non-conflicting query propagation module 212 include any memory components used for storage, execution, and data processing for performing processing activities associated with the respective modules. The communication module 206 and the non-conflicting query propagation module 212 may also form a portion of other circuitry described without departure from the scope of the present subject matter.

The database 114 provides storage capabilities for information associated with the automated propagation of non-conflicting queries capabilities of the DBMS_1 102. The database 114 includes a database catalog storage area 214, a logical table definition storage area 216, and a physical table storage area 218 that may be stored in the form of tables or other arrangements accessible by the DBMS_1 102.

The database catalog storage area 214 stores information associated with logical tables stored at other database management systems, such as the DBMS_2 104 through the DBMS_N 112, within the system 100. The information stored within the database catalog storage area 214 may be compiled in response to queries of other database nodes within the system 100 for logical table definitions stored at those other nodes. As such, the DMBS_1 102 may determine and store logical table definitions for other nodes within the system 100 for use during query processing.

The logical table definition storage area 216 stores information about logical tables stored locally to the DBMS_1 102. The logical tables map to physical data and physical tables stored within the physical table storage area 218. The physical table storage area 218 stores physical tables that may or may not be federated within a distributed database system, such as the system 100, based upon mappings defined within the respective logical table definition storage area 216.

As will be described in more detail below, a logical table definition associated with a particular database query is associated with the database query and forwarded to queried nodes within the system 100. Match criteria may be distributed to nodes within the system 100 in advance of queries and stored in the respective matching criteria storage area 210 of the distributed nodes. Additionally, match criteria may be forwarded along with a query. Nodes that receive a query compare the received logical table definition with stored local table definitions based upon any received or stored match criteria to determine whether there is a match between the received and locally stored logical table definitions. Additional processing is performed by a receiving node based upon any specified match criteria, as will be described in more detail below beginning with FIG. 3.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

The CPU 200, the display 202, the input device 204, the communication module 206, the memory 208, the non-conflicting query propagation module 212, and the database 114 are interconnected via an interconnection 220. The interconnection 220 may include a system bus, a network, or any other interconnection capable of providing the respective components with suitable interconnection for the respective purpose.

While the DBMS_1 102 is illustrated with and has certain components described, other modules and components may be associated with the DBMS_1 102 without departure from the scope of the present subject matter. Additionally, it should be noted that, while the DBMS_1 102 is described as a single device for ease of illustration purposes, the components within the DBMS_1 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the DBMS_1 102 are possible and all are considered within the scope of the present subject matter. It should also be understood that, though the database catalog storage area 214, the logical table definition storage area 216, and the physical table storage area 218 are shown within the database 114, they may also be stored within the memory 208 without departure from the scope of the present subject matter. Accordingly, the DBMS_1 102 may take many forms and may be associated with many platforms.

Figure 3:
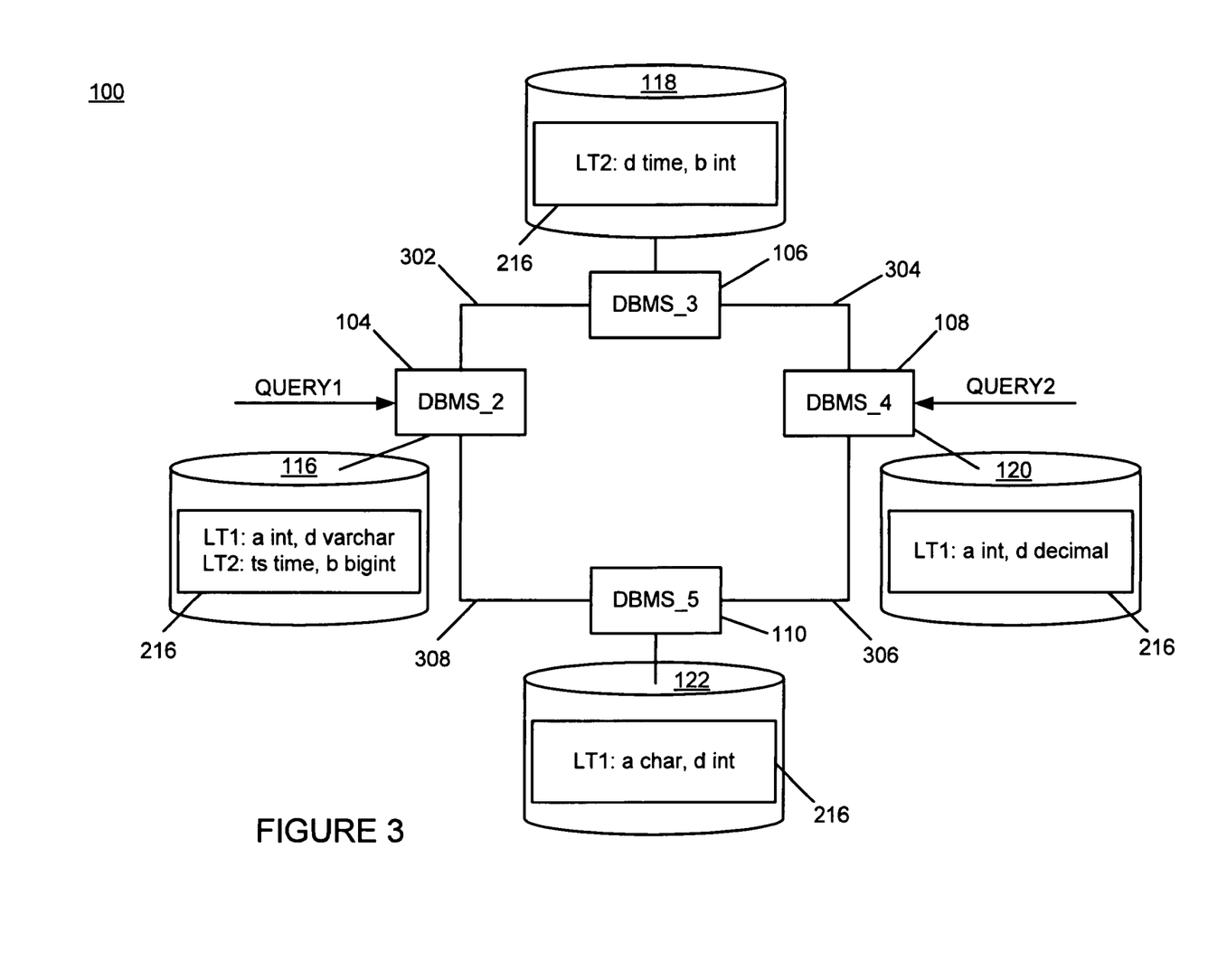
FIG. 3 is a block diagram of an example interconnection of components within the system of FIG. 1 to further illustrate an example of query processing within the system of FIG. 1 using column name matching according to an embodiment of the present subject matter.

FIG. 3 is a block diagram of an example interconnection of components within the system 100 of FIG. 1 to further illustrate an example of query processing within the system 100 using column name matching. It is understood that many other types of matching are possible, such as column data type matching, and name matching with columns in different table positions, and other types of matching. As such, all possible types of matching are considered within the scope of the present subject matter and the example of FIG. 3 provides sufficient detail for a person of skill in the art to make and use other types of matching.

As can be seen from FIG. 3, the general representation of the network 126 has been replaced with a connection 302 interconnecting the DMBS_2 104 and the DBMS_3 106. Additionally, a connection 304 interconnecting the DMBS_3 106 and the DBMS_4 108, a connection 306 interconnecting the DMBS_4 108 and the DBMS_5 110, and a connection 308 interconnecting the DMBS_5 110 and the DBMS_2 104 can also be seen in FIG. 3.

The DBMS_2 104 is shown issuing a "Query1" and the DBMS_4 108 is shown issuing a "Query2." The Query1 and the Query2 will be described in more detail below. As can be seen from FIG. 3, the logical table definition storage area 216 of each of the DBMS_2 104 through the DBMS_5 110 includes at least one logical table definition. The logical table definition storage area 216 of the DBMS_2 104 includes two logical table definitions, namely "LT1: a int, d varchar" and "LT2: ts time, b bigint." The logical table definition storage area 216 of the DBMS_3 106 includes one logical table definition "LT2: d time, b int." The logical table definition storage area 216 of the DBMS_4 108 includes logical table definition "LT1: a int, d decimal." The logical table definition storage area 216 of the DBMS_5 110 includes one logical table definition "LT1: a char, d int." Accordingly, the logical table definitions for the respective tables are different at each node that defines a given table.

With these example logical table definitions at each node identified, the following detailed query example using name-based column matching elaborates upon the present subject matter. For purposes of the present example, the Query1 issued by DBMS_2 104 and the Query2 issued by the DBMS_4 108 are assumed to be formed as shown in the following pseudo-query format.

select a from logical table 'LT1' as LT1 (Query1)
    select d from logical table 'LT1' as LT1 (Query2)

As can be seen from the pseudo-query format for Query1 and Query2, a query is formed using a "select" query identifier. The character following the select query identifier represents a column name for the associated logical table. As such, the Query1 and the Query2 are column name-based queries. Within the present example, the Query1 requests data associated with a column named "a" and the Query2 requests data associated with a column named "d." Each of the Query1 and the Query2 instructs receiving distributed database nodes to use logical table definitions for fulfillment of the respective queries with the phrase "from logical table" within each query. The requested logical table is shown within single quotation marks. As such, each of the Query1 and the Query2 request data associated with logical tables named "LT1." The second reference to "LT1" within the respective queries is an alias to a composite name for the logical table, again listed as "LT1" within the present example.

It should be noted that for purposes of the present description, a virtual table interface may be formed based upon the logical table definitions. The virtual table interface may be defined as a set of interfaces for representation of physical data for encapsulation and abstraction of the physical data within a distributed network of databases, such as the system 100. Class definitions may be constructed for creation and representation of the logical table definitions. For example, a class for a query may be defined in a syntactic representation, such as Java, to accept logical table name as an argument of a class constructor. A logical table definition may also be passed as a second argument to the class constructor. Upon instantiation, a query object may be created with the logical table name and definition associated with the query object. Distributed database nodes may make calls into the query object for logical table information and processing.

It should be noted that though the example Query1 and Query2 associated with FIG. 3 do not include communicated matching criteria, it is understood that the queries may be modified to include matching criteria without departure from the scope of the present subject matter. Further, as described above, matching criteria may be either communicated with the queries or may be stored locally in advance of issuance of a query. As such, default matching criteria may be established and stored within the matching criteria storage area 210 of the memory 208 at each distributed database node. For example, default matching may be strict matching for column name, column position within a logical table, column name data type, column name data precision, and other factors. Issued queries may modify default matching criteria to pass additional or alternative matching criteria instructing the receiving distributed database nodes to match based upon the additional matching criteria or to change default matching criteria. Example additional or alternative matching criteria include matching a column name in any position of a logical table, matching data precision based upon equal or greater precision within the respective logical table definitions, and other matching criteria. There are many other possible matching criteria that may be used and all are considered within the scope of the present subject matter.

Returning to the description of the present example, automated propagation of the Query1 will now be described. As described above, the Query1 is originated by the DBMS_2 104. The Query1 is processed internally by the DMBS_2 104 and is automatically propagated (e.g., forwarded), as described in more detail below. Regarding the internal processing at the DMBS_2 104, the Query1 is compared with locally-defined logical tables to identify a local logical table named "LT1." As can be seen from FIG. 3, a local logical table named "LT1" is defined within the logical table definition storage area 216 of the DBMS_2 104. Accordingly, the Query1 is processed locally to identify a physical table mapped by the logical table "LT1" within the physical table storage area 218 (not shown) and will result in the value of data stored within the mapped physical table associated with the column "a" in the logical table "LT1" being returned from the local database 116.

The DMBS_2 104 also forwards the Query1 to the DBMS_3 106 and to the DBMS_5 110 for processing. As described above and in more detail below, the DMBS_2 104 includes its logical table definition with the forwarded query. For purposes of the present example, the forwarded Query1 is assumed to be formed as shown in the following pseudo-query format.

select a from logical table 'LT1', 'a int, d varchar' as LT1 (Forwarded Query1)

As can be seen from the pseudo-query format for the forwarded Query1, the logical table definition of "LT1" associated with the DBMS_2 104 is forwarded as a portion of the Query1 to other nodes within the system 100. Referring to the DBMS_5 110, upon receipt of the forwarded Query1, the DBMS_5 110 performs a variety of operations to forward and fulfill the data request associated with the forwarded Query1. The DBMS_5 110 determines whether the received logical table definition matches a local logical table definition and processes matching logical table definitions. As will be described in more detail below, the DBMS_5 110 forwards the query to at least one other distributed database node and may alter some of the column's data values returned based upon its processing of the received logical table definition.

Within the present example, the logical table defined in association with the DBMS_5 110 has a logical table named "LT1," but the data type associated with the column "a" does not match the received logical table definition for the logical table "LT1." The received logical table definition shows that the data type associated with the column "a" has a data type of "int." However, the logical table defined in association with the DBMS_5 110 has a data type of "char" for the column "a." It is again noted that the forwarded Query1 does not include any matching criteria, but that matching criteria could be forwarded with the Query1 without departure from the scope of the present subject matter.

Accordingly, when the DBMS_5 110 receives the forwarded Query1, the DBMS_5 110 utilizes any matching criteria stored within the associated matching criteria storage area 210 (not shown) to determine whether the received logical table definition matches the local logical table definition for "LT1." Based upon at least the data type mismatch between the local "char" data type and the received "int" data type the DBMS_5 110 determines that the local logical table definition does not match the received logical table definition. For purposes of the present example, it can be seen that a "char" data type and an "int" data type are not compatible. As such, for the present example, promotion of the "char" data type to an "int" data type is not considered an acceptable promotion.

Accordingly, based upon the determined mismatch between the received and local logical table definitions for "LT1," the DBMS_5 110 will return a "null" result and issue a warning to DBMS_2 104 indicating that its local logical table definition does not match the received logical table definition. The DBMS_5 110 will also forward the received forwarded Query1 unaltered to the DBMS_4 108.

Upon receipt of the forwarded Query1, the DBMS_4 108 will perform similarly to the description above for the DBMS_5 110. However, the DBMS_4 108 determines that the local logical table definition for column "a" and the received logical table definition for column "a" of logical table "LT1" match because both logical tables define column "a" to have an "int" data type. As such, the DBMS_4 108 retrieves the data value associated with the logical column "a" of the local logical table "LT1" from the local physical table storage area 218 (not shown) and returns this data value through an available connection to the originating node, which is DBMS_2 104 within the present example. The DBMS_4 108 also forwards the Query1 to the DBMS_3 106. Additionally, the DBMS_4 108 forwards the Query1 to the DBMS_5 110

Depending upon interconnection and processing speed at various distributed database nodes within a given system, such as the system 100, the DBMS_3 106 may receive the Query1 from either the DBMS_2 104 or from the DBMS_4 108. If the DBMS_3 106 has previously received the Query1 from either device, the DBMS_3 106 will be able to determine that it does not need to forward the Query1. However, the first query received will be forwarded if the second query has not been received by the time the DBMS_3 106 is prepared to forward the Query1.

Regarding processing of the Query1 at the DBMS_3 106, as can be seen from FIG. 3, the DBMS_3 106 does not have a local definition for the logical table "LT1" and may determine this upon receipt of the Query1. The DBMS_3 106 responds to Query1 with a "null" result and a warning. If the DBMS_3 106 has previously received the Query1 and responded, it may respond to allow the originating node to track network interconnectivity, topology, and route timing information or may not respond based upon configuration.

Turning now to a description of the Query2 originated by the DBMS_4 108, the Query2 is processed locally by the DBMS_4 108 and automatically propagated in a similar fashion to that described above with respect to the Query1. Accordingly, reference is made to the description above for certain details associated with query processing and propagation. Certain distinctions between the processing of the Query1 and the Query2 will be described below. As described above, the Query2 is requesting data associated with a column "d" within a logical table named "LT1."

Regarding the internal processing of the Query2 at the DMBS_4 108, the Query2 is compared with locally defined logical tables to identify a local logical table named "LT1." As can be seen from FIG. 3, a local logical table named "LT1" is defined within the logical table definition storage area 216 of the DBMS_4 108. Accordingly, the Query2 is processed locally to identify a physical table mapped by the logical table "LT1" within the physical table storage area 218 (not shown) and will result in the value of data stored within the mapped physical table associated with the column "d" in the logical table "LT1" being returned from the local database 120.

The DMBS_4 108 also forwards the Query2 to the DBMS_3 106 and to the DBMS_5 110 for processing. As described above and in more detail below, the DMBS_4 108 includes its logical table definition with the forwarded query. For purposes of the present example, the forwarded Query2 is assumed to be formed as shown in the following pseudo-query format.
select d from logical table 'LT1', 'a int, d decimal' as LT1 (Forwarded Query2)

As can be seen from the pseudo-query format for the forwarded Query2, the logical table definition of "LT1" associated with the DBMS_4 108 is forwarded as a portion of the Query2 to other nodes within the system 100. Referring to the DBMS_5 110, upon receipt of the forwarded Query2, the DBMS_5 110 performs a variety of operations to forward and fulfill the data request associated with the forwarded Query2. The DBMS_5 110 determines whether the received logical table definition matches a local logical table definition and processes matching logical table definitions. As will be described in more detail below, the DBMS_5 110 forwards the query to at least one other distributed database node and may alter some of the column's data values returned based upon its processing of the received logical table definition.

Within the present example, the logical table defined in association with the DBMS_5 110 has a logical table named "LT1," but the data type associated with the column "d" does not match the received logical table definition for the logical table "LT1." The received logical table definition shows that the data type associated with the column "d" has a data type of "decimal." However, the logical table defined in association with the DBMS_5 110 has a data type of "int" for the column "d." As described above, a query, such as the Query2, may include matching criteria without departure from the scope of the present subject matter or matching criteria may be stored prior to a query within the associated matching criteria storage area 210 (not shown).

Accordingly, when the DBMS_5 110 receives the forwarded Query2, the DBMS_5 110 utilizes any matching criteria to determine whether the received logical table definition matches the local logical table definition for "LT1." Based upon at least the data type mismatch between the local "int" type and the received "decimal" type the DBMS_5 110 determines that the local logical table definition does not exactly match the received logical table definition. For purposes of the present example, it is assumed that casting may be performed between otherwise compatible data types (e.g., numeric).

As such, for the present example, the "int" data type associated with the local logical table is implicitly cast to a "decimal" data type for response to the query. Accordingly, the DBMS_5 110 retrieves the physical data value associated with the column "d" from the associated physical table storage area 218 (not shown) and casts the retrieved data value to a decimal data type. As described above, the determination to cast a data type may be based upon match criteria stored within the associated match criteria storage area 210 within the memory 208 or communicated in association with the Query2.

The DBMS_5 110 formats a response to the Query2 and forwards the response over an available connection to the originating node, which is DBMS_4 108 within the present example. The DBMS_5 110 may also return a warning to DBMS_4 108 indicating that its local logical table definition does not exactly match the received logical table definition and may identify the casting operation performed. Also, the DBMS_5 110 forwards the received forwarded Query2 to the DBMS_2 104 for processing.

Upon receipt of the forwarded Query2, the DBMS_2 104 will perform similarly to the description above for the DBMS_5 110. However, the DBMS_2 104 determines that the local logical table definition for column "d" and the received logical table definition for column "d" of logical table "LT1" do not match because the data type associated with the local column "d" has a "varchar" data type. Based upon at least the data type mismatch between the local "varchar" data type and the received "decimal" data type the DBMS_2 104 determines that the local logical table definition does not match the received logical table definition. For purposes of the present example, it can be seen that a "varchar" data type and an "decimal" data type are not compatible. As such, for the present example, promotion of the "varchar" data type to a "decimal" data type is not considered an acceptable promotion or cast operation.

Accordingly, based upon the determined mismatch between the received and local logical table definitions for "LT1," the DBMS_2 104 will return a "null" result and issue a warning to DBMS_4 108 indicating that its local logical table definition does not match the received logical table definition. The DBMS_2 104 will also forward the received forwarded Query2 unaltered to the DBMS_3 106.

Depending upon interconnection and processing speed at various distributed database nodes within a given system, such as the system 100, the DBMS_3 106 may receive the Query2 from either the DBMS_2 104 or from the DBMS_4 108. If the DBMS_3 106 has previously received the Query2 from either device, the DBMS_3 106 will be able to determine that it does not need to forward the Query2. However, the first query received will be forwarded if the second query has not been received by the time the DBMS_3 106 is prepared to forward the Query2.

Regarding processing of the Query2 at the DBMS_3 106, as can be seen from FIG. 3, the DBMS_3 106 does not have a local definition for the logical table "LT1" and may determine this upon receipt of the Query2. The DBMS_3 106 responds to Query2 with a "null" result and a warning. If the DBMS_3 106 has previously received the Query2 and responded, it may respond to allow the originating node to track network interconnectivity, topology, and route timing information or may not respond based upon configuration.

Accordingly, the example of FIG. 3 shows that several configuration and processing options for automated propagation of non-conflicting queries in distributed database systems, such as the system 100. Distributed database nodes receive logical table definitions in association with database queries. The nodes determine whether a locally-defined logical table matches the received logical table definition. The nodes process queries that include logical table definitions that match local logical table definitions and forward received queries to other distributed nodes for processing. Matching criteria may be used to configure, vary, and alter match determination and processing of queries. Data types may be promoted, cast, demoted, or changed based upon the configured match criteria. Many other configuration and processing options are possible and all are considered within the scope of the present subject matter.

Figure 4:
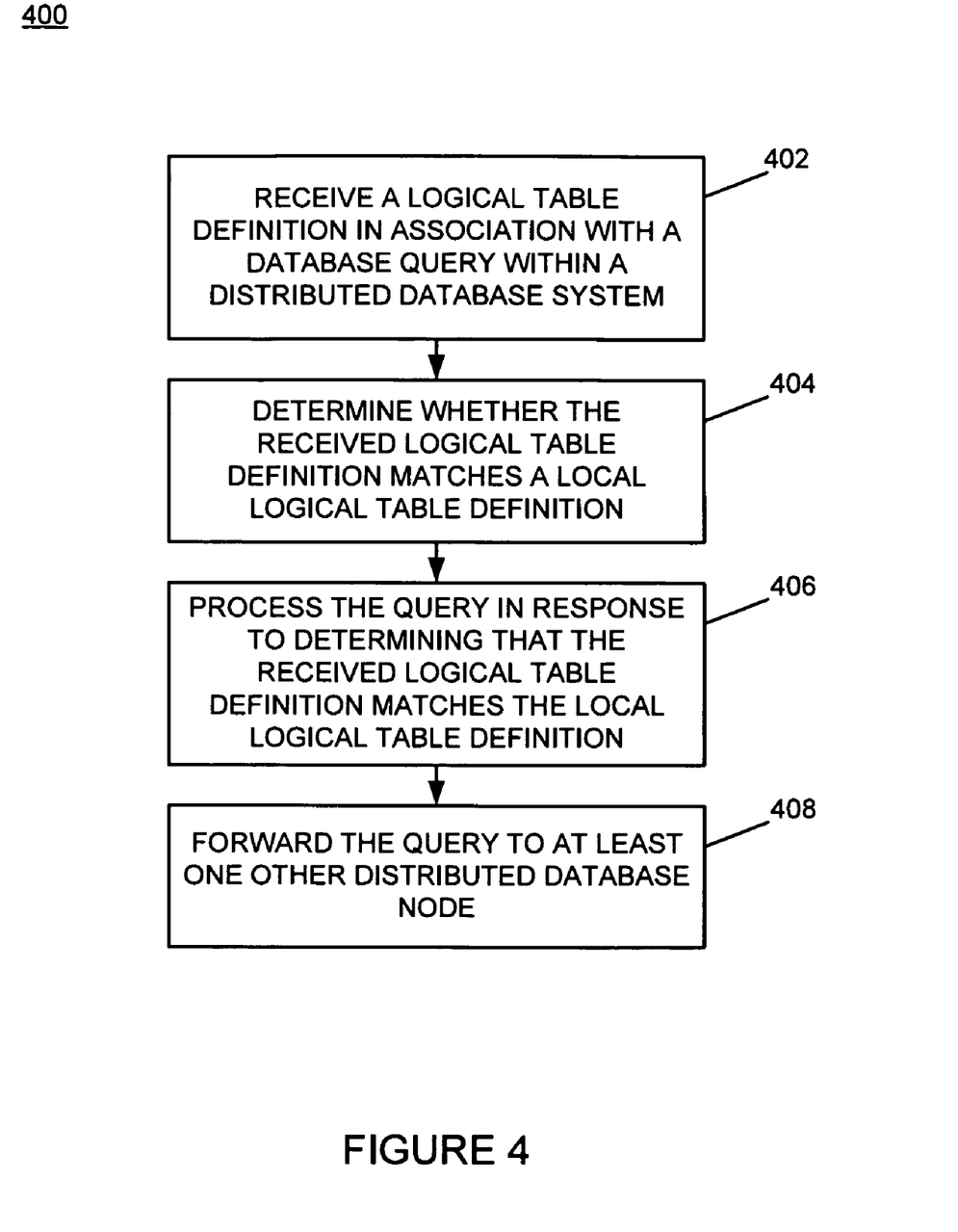
FIG. 4 is a flow chart of an example of an implementation of a process for automated propagation of non-conflicting queries in distributed databases according to an embodiment of the present subject matter.
Figure 5:
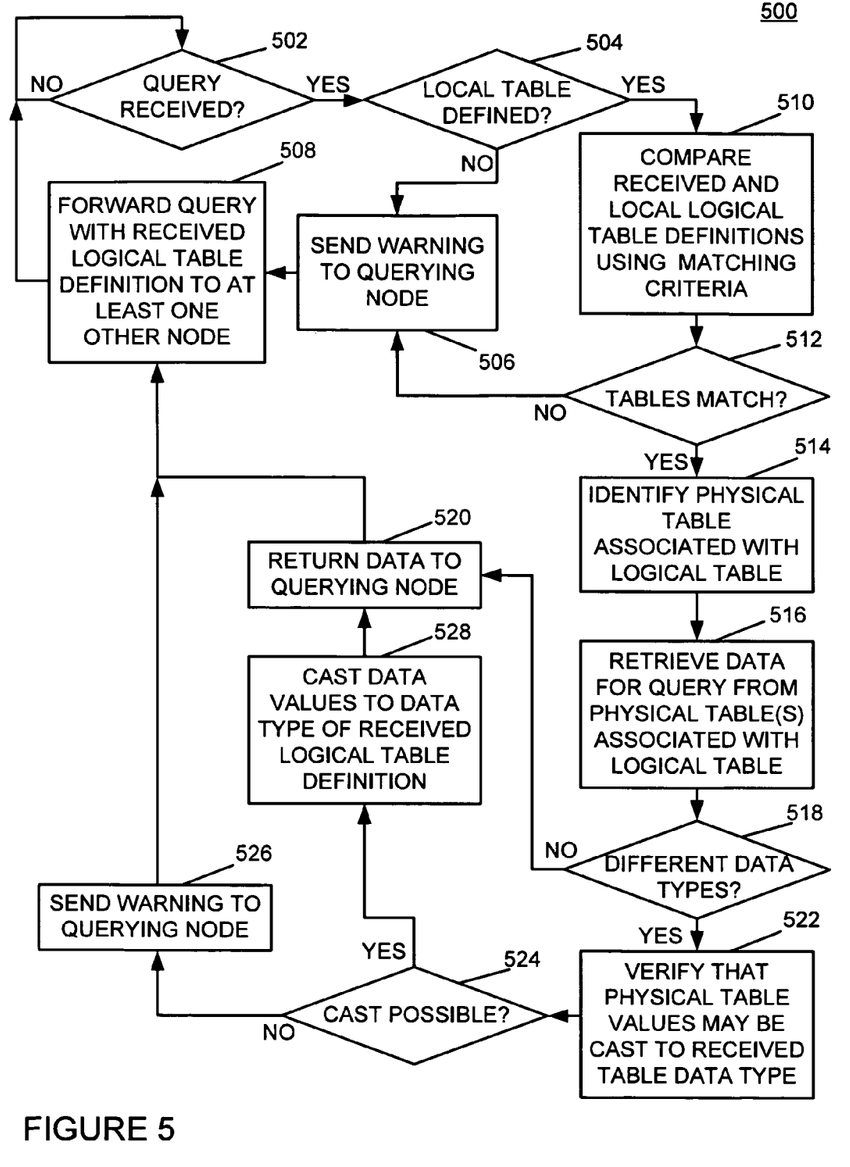
FIG. 5 is a flow chart of an example of an implementation of a process for automated propagation of non-conflicting queries in distributed databases based upon logical table matching criteria according to an embodiment of the present subject matter.
Figure 6:
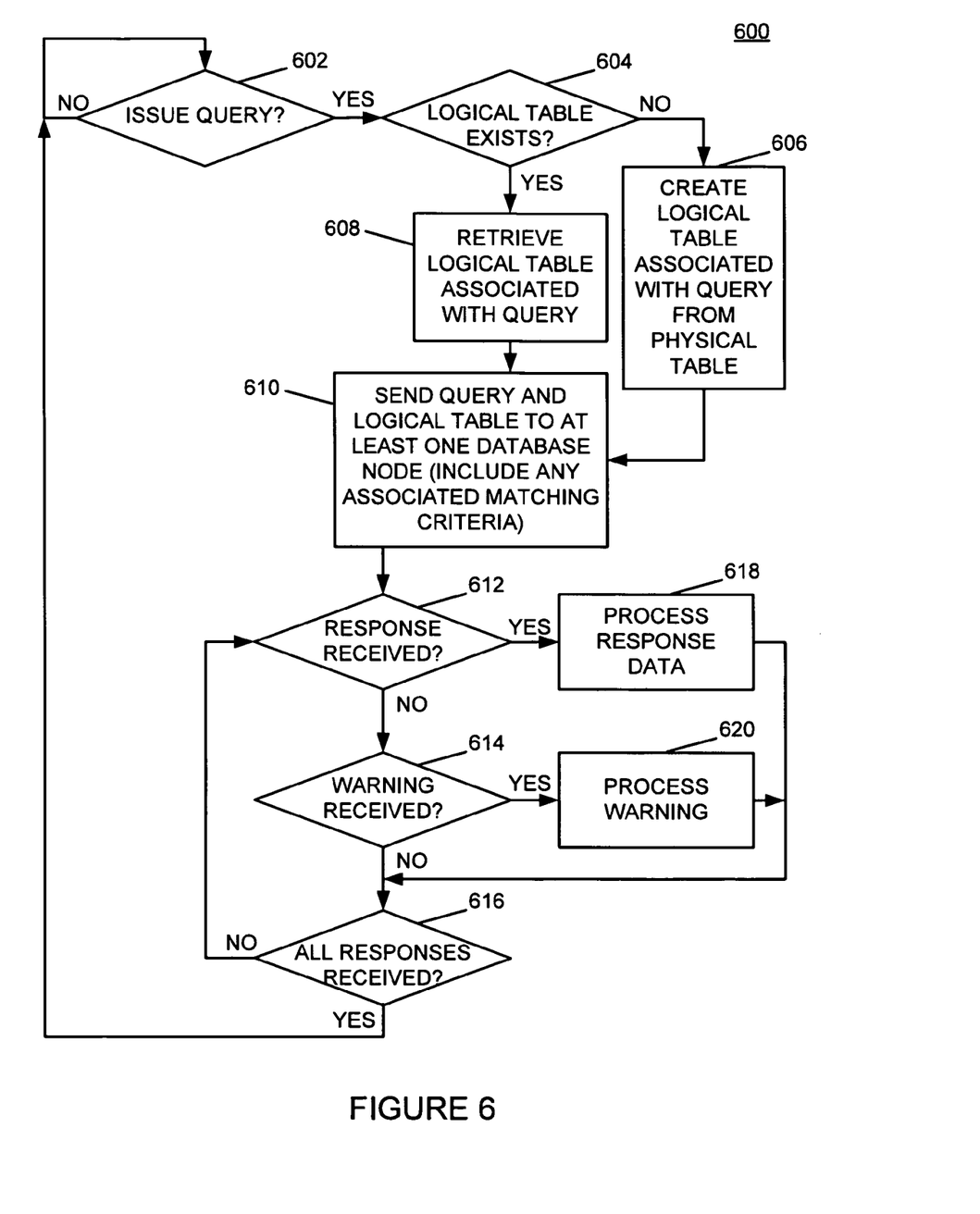
FIG. 6 is a flow chart of an example of an implementation of a process for processing performed at an originating node based upon automated propagation of non-conflicting queries in distributed databases according to an embodiment of the present subject matter.

FIGS. 4 through 6 below describe example processes that may be executed by distributed database devices, such as the DBMS_1 102 through the DBMS_N 112, to perform the automated propagation of non-conflicting queries associated with the present subject matter. The example processes may be performed by modules, such as the non-conflicting query propagation module 212 and/or the CPU 200, associated with distributed database devices. It should be noted that time out procedures and other error control procedures are not illustrated within the example processes described below for ease of illustration purposes. However, it is understood that all such procedures are considered to be within the scope of the present subject matter.

FIG. 4 is a flow chart of an example of an implementation of a process 400 for automated propagation of non-conflicting queries in distributed databases. At block 402, the process 400 receives a logical table definition in association with a database query within a distributed database system. At block 404, the process 400 determines whether the received logical table definition matches a local logical table definition. At block 406, the process 400 processes the query in response to determining that the received logical table definition matches the local logical table definition. At block 408, the process 400 forwards the query to at least one other distributed database node.

FIG. 5 is a flow chart of an example of an implementation of a process 500 for automated propagation of non-conflicting queries in distributed databases based upon logical table matching criteria. At decision point 502, the process 500 waits for a query to be received. When a query is received, the process 500 makes a determination as to whether a logical table definition with the same name is defined locally at decision point 504.

When a determination is made that there is not a locally-defined logical table with the same name, the process 500 sends a warning to the originating (e.g., querying) node or the node from which the query was received at block 506. The process 500 forwards the query to at least one other node at block 508 and returns to decision point 502 to await a new query and continues processing as described above.

It should be noted that, as described above in association with FIG. 3, a database management system, such as the DBMS_1 102 through the DBMS_N 112, may forward the received query to one or more additional nodes based upon network topology and other factors. For example, if the node that executes the process 500 is interconnected to two nodes other than the node from which it received the query, the process 500 may forward the query to both nodes. Additionally, if the node that executes the process 500 has already received the query previously and forwarded the query to all additional interconnected nodes, the process 500 may not forward the query and may instead report back to the originating node to allow that node to track network interconnectivity, topology, and route timing information.

Returning to the description of decision point 504, when a determination is made that a local logical table is defined with the same name as the logical table referenced within the query, the process 500 compares the received logical table definition with the local logical table definition using any associated matching criteria at block 510. As described above, the matching criteria may be stored as part of a configuration for the process 500 or received with the query. Additionally, the matching may be performed based upon a column name match, a column data type match, a column data type match independent of the column name, or may be performed based upon other matching criteria without departure from the scope of the present subject matter.

At decision point 512, the process 500 makes a determination as to whether the received logical table and local logical table match. The determination at decision point 512 may be performed by exact matching for column name and data type, by column name matching at any location within the locally-defined logical table, by column data type matching at any location within the locally-defined logical table, or by any other matching criteria.

When a determination is made at decision point 512 that the received logical table and local logical table do not match, the process 500 returns to block 506 and continues processing as described above. When a determination is made that the received logical table and local logical table match, the process 500 identifies a physical table associated with the local logical table definition at block 514. At block 516 the process 500 retrieves data for the query from one or more physical data tables mapped by and associated with the local logical table definition.

At decision point 518, the process 500 determines whether any data types associated with a column of the received logical table definition are different data types from data types of any local physical table data values. When a determination is made that no data types associated with a column of the received logical table definition are different data types from data types of any local physical table data values, the process 500 returns the data to the querying node at block 520 and continues to block 508 to continue processing as described above.

When a determination is made at decision point 518 that at least one data type associated with a column of the received logical table definition is a different data type from a data type of a local physical table data value, the process verifies that the physical table values may be cast implicitly to the types of the received logical table definition at block 522. At decision point 524, the process 500 makes a determination as to whether implicit casting from the physical table's data values to the received logical table definition's data types is possible. For example, data field bit count, data type, data value ranges, and other factors may be used to make the determination regarding possible implicit casting. As such, any form of data type precision determination may be used. Additionally, as described above, the determination as to whether the implicit casting is possible may also be based upon stored or received matching criteria or may be based upon default matching criteria, such as exact data type matching. As such, the process 500 makes the determination at decision point 524 based upon the available matching configuration and matching criteria.

When a determination is made at decision point 524 that at least one of the local physical data values cannot be cast implicitly to the corresponding received logical table definition's data type, the process 500 sends a warning to the querying node at block 520 and returns to block 508 to continue processing as described above. When a determination is made at decision point 524 that the implicit casting is possible from all locally-defined data values to the received logical table definition's data types, the process 500 implicitly casts data values to the data type associated with the received logical table definition at block 528 and returns the data to the querying node at block 520 and continues to block 508 to continue processing as described above.

Accordingly, the process 500 illustrates example processing that may be performed on a distributed database node that receives and processes a query. The processing includes comparing the received logical table definition with a local logical table definition, determining whether the tables match based upon configured or received matching criteria, verifying that any mis-matched data types may be cast to the data type associated with the respective data vales in the received table, performing an implicit cast operation for data types that may be implicitly cast based upon data types associated with the received and locally-stored logical tables, and forwarding the query to other distributed database nodes.

FIG. 6 is a flow chart of an example of an implementation of a process 600 for processing performed at an originating node based upon automated propagation of non-conflicting queries in distributed databases. At decision point 602, the process 600 makes a determination as to whether to issue a query. The determination may be based upon application-level data processing requirements, distributed network testing, or other factors without departure from the scope of the present subject matter. When a determination is made to issue a query, the process 600 makes a determination as to whether a logical table definition exists in association with the requested query operation at decision point 604.

When a determination is made at decision point 604 that there is not a logical table definition associated with the requested query operation, the process 600 creates the logical table definition from a physical table at block 606. It should be noted that creation of a logical table definition includes identification of column names and column data types for a logical table based upon physical data values that are or that are to be associated with the logical table definition. Additionally, creation of a logical table definition may include definition of matching criteria for the logical table. The matching criteria, as described above, may be based upon matching to be performed by distributed database nodes that process the received query, such as column name, column data type, column name position, or other matching criteria without departure from the scope of the present subject matter.

When a determination is made at decision point 604 that there is a logical table definition associated with the requested query operation, the process 600 retrieves the logical table definition at block 608. Retrieval of the logical table definition may include retrieval of any associated matching criteria that are to be forwarded with the query to distributed database nodes for processing of the query. Upon creation of the logical table definition at block 606 or retrieval of the logical table definition at block 608, the process 600 sends the query including the associated logical table definition and any matching criteria to at least one other database node for processing at block 610.

It should be noted that for ease of illustration purposes the process 600 does not illustrate processing associated with querying distributed database nodes to retrieve locally-defined logical table definitions or for the creation of database catalogs of distributed logical table definitions. However, it is understood that the process 600 or any other process may be readily modified to include this type of behavior. Accordingly, all such modifications are considered within the scope of the present subject matter.

At decision point 612, the process 600 makes a determination as to whether a response to the query has been received. For purposes of the present example, a response to the query may be considered any data received in response to a query. When a determination is made that a response to the query has not been received, the process 600 makes a determination at decision point 614 as to whether a warning has been received. For purposes of the present example, a warning may be considered any warning generated by a receiving node in response to receipt and processing of a logical table definition in association with a query, such as described above in association with FIG. 5. When a determination is made that a warning has not been received, the process 600 makes a determination at decision point 616 as to whether all anticipated responses have been received. When a determination is made that all anticipated responses have not been received, the process 600 iterates to decision point 612 and continues processing as described above and in more detail below.

When a determination is made at decision point 612 that a response to the query has been received, the process 600 processes the response data at block 618. Processing of the response data includes forwarding the response data to an application-level process that requested origination of the query. Processing of the response data may also include determination of casting, promotion, or demotion of data type based upon the received response data, promotion of a data type associated with a column of the logical table definition stored at the originating node in response to receipt of a promoted data type, and may include other processing of the received data. For example, the processing may also include determining route processing times and other related processing. Many other types of processing of received query response data are possible and all are considered within the scope of the present subject matter. Upon completion of any associated processing of the received query response data, the process 600 continues to decision point 616 to continue processing as described above.

Returning to the description of decision point 614, when the process 600 makes a determination that a warning has been received, the process 600 processes the received warning at block 620. Processing of the received warning may include sending a logical table definition and/or associated physical data to a distributed database node that does not have the logical table defined. Processing of the received warning may also include determination of casting, promotion, or demotion of data at responding nodes, sending an updated logical table definition to a distributed database node that has identified a logical table mismatch or that has an obsolete logical table definition. As described above, a mismatch warning may be generated by a distributed database node based upon a column name mismatch, a column data type mismatch, a column name position mismatch, a column data type precision mismatch, or other matching criteria. The processing of the received warning may also include sending an instruction to a distributed database node to increase precision of a data type that was demoted of a data type during processing of the query at the distributed database node. Many other types of processing of warnings are possible and all are considered within the scope of the present subject matter.

Upon completion of any associated processing of the received warning, the process 600 continues to decision point 616 to continue processing as described above. When a determination is made at decision point 616 that all anticipated responses have been received, either in the form of responses to the queries including response data or warnings, the process 600 returns to decision point 602 to continue processing as described above.

Accordingly, the process 600 illustrates example processing that may be performed on a distributed database node that originates a query. The processing includes creation or retrieval of logical table definitions and matching criteria, sending a query for processing within a distributed network of databases, and receiving and processing data and warnings in response to issued queries.

As described above in association with FIGS. 1 through 6, the example systems and processes provide automated propagation of non-conflicting queries in distributed databases. Many other variations and additional activities associated with automated propagation of non-conflicting queries in distributed databases are possible and all are considered within the scope of the present subject matter.

Those skilled in the art will recognize, upon consideration of the above teachings, that certain of the above examples are based upon use of a programmed processor such as the CPU 200. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
   receiving, via a processor, a logical table definition in association with a database query within a distributed database system;
   determining whether the received logical table definition matches a local logical table definition, where determining whether the received logical table definition matches the local logical table definition comprises:
      comparing at least one of a column name and a column data type of the received logical table definition with at least one of a column name and a column data type of the local logical table definition; and
      identifying a match for the at least one of the column name and the column data type of the received logical table definition at a position within the local logical table definition different from a position of the at least one of the column name and the column data type within the received logical table definition;
   processing the query in response to determining that the received logical table definition matches the local logical table definition; and
   forwarding the query to at least one other distributed database node.

2. The method of claim 1, where comparing at least one of a column name and a column data type of the received logical table definition with at least one of a column name and a column data type of the local logical table definition comprises determining whether there is the at least one of the column name match and the column data type match between the received logical table definition and the local logical table definition.

3. The method of claim 1, where processing the query in response to determining that the received logical table definition matches the local logical table definition comprises:
   identifying a local physical table associated with the local logical table definition;
   retrieving at least one data element from a local physical table storage location associated with the local physical table based upon a determination of at least one of the column name match and the column data type match between the received logical table definition and the local logical table definition; and
   responding to the query with the retrieved at least one data element.

4. The method of claim 1, where forwarding the query to at least one other distributed database node comprises forwarding the received logical table definition with the forwarded query.

5. The method of claim 1, further comprising generating a warning when the local logical table definition does not match the received logical table definition and sending the warning in response to the database query.

6. A method, comprising:
   receiving, via a processor, a logical table definition in association with a database query within a distributed database system;
   determining whether the received logical table definition matches a local logical table definition;
   processing the query in response to determining that the received logical table definition matches the local logical table definition, where processing the query in response to determining that the received logical table definition matches the local logical table definition comprises:
      determining whether a data type of at least one column of the received logical table definition is a different data type from a data type of at least one local physical table data value; and
      determining whether the at least one local physical table data value may be cast implicitly to the data type of the at least one column of the received logical table definition in response to determining that the data type of the at least one column of the received logical table definition is different from the data type of the at least one local physical table data value; and
   forwarding the query to at least one other distributed database node.

7. The method of claim 6, where processing the query in response to determining that the received logical table definition matches the local logical table definition further comprises:
   casting a data type of the at least one local physical table data value retrieved from a local physical table storage location associated with a local physical table mapped by the local logical table definition to the data type of the at least one column of the received logical table definition in response to determining that the data type of the at least one column of the received logical table definition is different from the data type of the at least one local physical table data value and that the at least one physical table data value may be cast implicitly to the data type of the at least one column of the received logical table definition.

8. The method of claim 7, where forwarding the query to at least one other distributed database node comprises forwarding the local logical table definition with the forwarded query.

9. A system, comprising:
a memory adapted to store information associated with propagation of non-conflicting queries in distributed databases; and
a processor programmed to:
receive a logical table definition in association with a database query within a distributed database system;
store the received logical table definition to the memory;
determine whether the received logical table definition matches a local logical table definition, where, in being programmed to determine whether the received logical table definition matches the local logical table definition, the processor is programmed to:
compare at least one of a column name and a column data type of the received logical table definition with at least one of a column name and a column data type of the local logical table definition; and
identify a match for the at least one of the column name and the column data type of the received logical table definition at a position within the local logical table definition different from a position of the at least one of the column name and the column data type within the received logical table definition;
process the query in response to determining that the received logical table definition matches the local logical table definition; and
forward the query to at least one other distributed database node.

10. The system of claim 9, where, in being programmed to compare at least one of a column name and a column data type of the received logical table definition with at least one of a column name and a column data type of the local logical table definition, the processor is programmed to determine whether there is at least one of the column name match and the column data type match between the received logical table definition and the local logical table definition.

11. The system of claim 9, where, in being programmed to process the query in response to determining that the received logical table definition matches the local logical table definition, the processor is programmed to:
identify a local physical table associated with the local logical table definition;
retrieve at least one data element from a local physical table storage location associated with the local physical table based upon a determination of the at least one of the column name match and the column data type match between the received logical table definition and the local logical table definition; and
respond to the query with the retrieved at least one data element.

12. The system of claim 9, where, in being programmed to forward the query to at least one other distributed database node, the processor is programmed to generate a warning when the local logical table definition does not match the received logical table definition and send the warning in response to the database query.

13. The system of claim 9, where the processor is further programmed to generate a warning when the local logical table definition does not match the received logical table definition and send the warning in response to the database query.

14. A system, comprising:
a memory adapted to store information associated with propagation of non-conflicting queries in distributed databases; and
a processor programmed to:
receive a logical table definition in association with a database query within a distributed database system;
store the received logical table definition to the memory;
determine whether the received logical table definition matches a local logical table definition;
process the query in response to determining that the received logical table definition matches the local logical table definition, where, in being programmed to process the query in response to determining that the received logical table definition matches the local logical table definition, the processor is programmed to:
determine whether a data type of at least one column of the received logical table definition is a different data type from a data type of at least one local physical table data value; and
determine whether the at least one local physical table data value may be cast implicitly to the data type of the at least one column of the received logical table definition in response to determining that the data type of the at least one column of the received logical table definition is different from the data type of the at least one local physical table data value, and
forward the query to at least one other distributed database node.

15. The system of claim 14, where, in being programmed to process the query in response to determining that the received logical table definition matches the local logical table definition, the processor is further programmed to:
cast a data type of the at least one local physical table data value retrieved from a local physical table storage location associated with a local physical table mapped by the local logical table definition to the data type of the at least one column of the received logical table definition in response to determining that the data type of the at least one column of the received logical table definition is different from the data type of the at least one local physical table data value and that the at least one physical table data value may be cast implicitly to the data type of the at least one column of the received logical table definition.

16. The system of claim 15, where, in being programmed to forward the query to at least one other distributed database node, the processor is programmed to forward at least one of the local logical table definition and the received logical table definition with the forwarded query.

17. A system, comprising:
a memory adapted to store information associated with propagation of non-conflicting queries in distributed databases; and
a processor programmed to:
receive a logical table definition in association with a database query within a distributed database system;
store the received logical table definition to the memory;

compare at least one of a column name and a column data type of the received logical table definition with at least one of a column name and a column data type of a local logical table definition;

determine whether the received logical table definition matches the local logical table definition, where, in being programmed to determine whether the received logical table definition matches the local logical table definition, the processor is programmed to:

identify a match for at least one of a column name and a column data type of the received logical table definition at a position within the local logical table definition different from a position of the at least one of the column name and the column data type within the received logical table definition; and in response to determining that the received logical table definition matches the local logical table definition:

identify a local physical table associated with the local logical table definition;

retrieve at least one data element from a local physical table storage location associated with the local physical table based upon a determination of at least one of the column name match and the column data type match between the received logical table definition and the local logical table definition; and respond to the query with the retrieved at least one data element; and forward the query to at least one other distributed database node.

18. The system of claim 17, where, in being programmed to forward the query to at least one other distributed database node, the processor is programmed to forward the local logical table definition with the forwarded query.

19. The system of claim 17, where, in being programmed to forward the query to at least one other distributed database node, the processor is programmed to forward the received logical table definition with the forwarded query.

20. The system of claim 17, where the processor is further programmed to generate a warning when the local logical table definition does not match the received logical table definition and send the warning in response to the database query.

* * * * *